Patented July 16, 1935

2,007,987

UNITED STATES PATENT OFFICE 2,007,987

PROCESS OF PRODUCING MOLDED ARTICLES FROM UREA OR ITS DERIVATIVES AND SOLID POLYMERIC ALDEHYDES

Otto Süssenguth, Erkner, near Berlin, Germany, assignor, by mesne assignments, to Bakelite Corporation, New York, N. Y., a corporation of Delaware No Drawing. Application July 10, 1929, Serial No. 377,332. In Germany September 13, 1928

3 Claims. (Cl. 18—55)

In my application Ser. No. 334,601 filed January 23, 1929, I have described a new process of producing molded articles from urea or its derivatives and aldehydes by causing the components to react in a dry state. The process consists in mixing urea, solid polymeric aldehydes such as paraformaldehyde and suitable organic or inorganic filling bodies as for instance cellulose, derivatives of cellulose, wood flour, asbestos, kaolin, graphite or the like in a ball mill or in another suitable device until a homogeneous intimate mixture is obtained, and thereupon molding the mass in the usual manner under hot-press conditions. For instance 100 parts by weight of urea, 100 parts of paraformaldehyde, 200 parts of lithopone, 100 parts of paper pulp and 50 parts of phenol formaldehyde resin are mixed in a kneading machine until a mass is obtained which is brittle in the cold. This mass is then ground and hot pressed. I have found that the manufacture of molded articles according to the process described in my said application Ser. No. 334,601 can be accelerated or retarded by adding suitable contact agents. The retardation of the course of reaction may be desirable if the reaction mass is to be kept for a long time in a thinly liquid state in order to facilitate the incorporation of a relatively large proportion of porous or fibrous filling material or if it is desirable to give to the mixture a better flowing capacity. In such case basic substances such as ammonia, hydroxide of calcium, hexamethylenetetramine or basic salts as for instance sodium carbonate etc. may be added to the reaction mass. On the other hand the acceleration of the course of reaction and the hardening may be brought about by adding acids or acid salts such as citric acid, acetic acid, hydrochloric acid, nitrate of urea etc. The accelerating or retarding contact agents may also be used mixed with one another or several agents may be used successively. The admixture of contact agents influences the properties of the molding mixtures as far as pressing time, pressing temperature, flowing capacity etc. are concerned.

By the term "contact agent" as used in this application accelerating as well as retarding additions are meant.

Example 1

| | Parts |
|---|---|
| Urea | 100 |
| Paraformaldehyde | 100 |
| Lithopone | 200 |
| Wood flour | 50 |
| Citric acid | 2 | are ground in the ball mill until a homogeneous mixture is obtained. The ground mixture is hot-pressed in molds to form molded articles, the acid present serving to accelerate the reaction and the hardening in the molds.

Example 2

| | Parts |
|---|---|
| Urea | 100 |
| Paraformaldehyde | 80 |
| Lithopone | 200 |
| Paper pulp | 100 |
| Calcium hydroxide | 2 | are mixed in the heat in a kneading machine until a homogeneous mass is obtained which is brittle in the cold and then ground in the usual manner. The presence of the calcium hydroxide acts as a retardant in a subsequent hot-pressing operation.

I claim:

1. In a process of making a molded article from a mixture obtained by commingling in the dry solid state a urea compound, a solid polymeric aldehyde and a filler and thereupon hot-molded to cause resin condensation and hardening of the resin simultaneously with the formation of the article, the step which comprises including a contact agent in the mixture to thereby effect a control of the course of the resin-forming reaction.

2. Process according to claim 1 in which the contact agent is a basic substance to cause retardation of the resin-forming reaction.

3. Process according to claim 1 in which the contact agent is of acidic character to cause acceleration of the resin-forming reaction.

OTTO SÜSSENGUTH.